Sept. 19, 1939.  D. O. SPROULE  2,173,316
INDICATING INSTRUMENT
Filed June 30, 1937  2 Sheets—Sheet 1

Inventor
Donald Orr Sproule
by Wilkinson & Mawhinney
Attorneys.

UNITED STATES PATENT OFFICE 2,173,316

INDICATING INSTRUMENT

Donald Orr Sproule, Ilford, England, assignor to Henry Hughes & Son Limited, London, England, a corporation of Great Britain Application June 30, 1937, Serial No. 151,287
In Great Britain July 10, 1936

2 Claims. (Cl. 240—2.1)

This invention relates to meters, gauges, or other indicating instruments having a scale and pointer or like indicator movable in relation to one another, and it is customary to protect instruments from the effects of dust and moisture or other deleterious influences by enclosing the instrument in a case with a cover glass through which the indications can be observed.

Most instruments are fitted with an ordinary flat cover glass and in these cases it is almost impossible to take a reading under normal conditions of lighting without at the same time seeing external objects reflected in the glass, whereas the most important requisite of an indicating instrument is that the indication should be easily visible and free from distracting optical effects. The obscuring effect of the undesirable reflections can sometimes be avoided by a movement of the observer's head, whereas in some cases, with aircraft instruments for example, it is particularly desirable that the instrument should be instantly readable without it being necessary to move about until the reflections obscuring the scale and pointer are no longer seen.

The primary object of the present invention is to provide an indicating instrument in which objectionable reflections from the cover glass are eliminated, while at the same time the protective function of the cover glass is unimpaired. A further object is to provide improved and evenly distributed illumination of the pointer and scale of the instrument.

In my improved arrangement, the portion of the cover glass through which the indications given by the instrument are viewed has its surface inclined to the normal line of vision, that is inclined with respect to a line perpendicular to the plane of the scale or to the plane in which a pointer or other indicator moves, where the instrument dial is flat, and means are provided to cut off rays of light from external objects which would otherwise be reflected into the observer's eyes by the inclined surface of the glass.

In the case of an instrument having a circular or arcuate scale and a circular cover glass, the peripheral portion of the glass has its front surface inclined to the remainder of the glass surface, this inclined or bevelled portion being of sufficient width to enable the scale and pointer to be viewed therethrough, and round the edge of the cover glass is placed a cylindrical shield which has its inner surface blackened so that no light can be reflected from the inclined annular portion of the glass into the eyes of the observer.

Both the front and back surfaces of the cover glass may be inclined and in this case the cover glass would be in the form of a hollow truncated cone and all possibility of troublesome reflection thereby eliminated. It may be desirable, however, to mark a scale on the back surface of the glass and the cover glass is then made in the form of a solid truncated cone. It is found in practice that reflections from the plane back surface of a cover glass of this form are not troublesome and cannot be detected under ordinary conditions of use.

This feature of inclining to the normal line of vision the part of the cover glass through which observations are made also affords a simple and efficient optical system for the internal illumination of the instrument and, according to a further feature of the invention, a cover glass of the kind above described is combined with a light source positioned so that the light from it reflected from the inclined glass surface is directed on to the scale and pointer of the instrument.

In the case of the constructions above described, the light source, which conveniently consists of a small electric bulb, is placed behind the central plane portion of the cover glass and a circular light shield is provided over this central portion to prevent direct light from the source reaching the observer's eyes.

As some of the light from the source does not fall on the inclined part of the glass, it is obviously an advantage to shape the central part of the cover glass to reflect light on to the pointer and scale. This central portion, instead of being plane, may be formed into a cusp-shaped reflector so that light from an electric bulb positioned opposite the point of the cusp is reflected on to the scale and the pointer. The bulb may also have behind it a small spherical reflector to direct practically all the light from the bulb towards the cusp-shaped reflector and cover glass.

When the cover glass is in the form of a solid truncated cone, the light source is positioned in a hole bored in the centre of the cover glass.

The inclined portion or "viewing window" of the cover glass may have a curved or hollowed surface to enable a minimum height of shield to be used.

Examples of the constructions above described are illustrated in the accompanying drawings in which.

Figure 1:
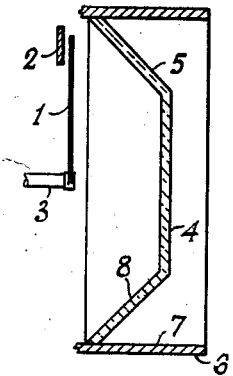
Fig. 1 is a sectional elevation of one arrangement according to the invention.

The drawings show the invention as applied to an instrument having an arcuate or circular scale and a circular cover glass but it will be obvious that the instrument case and cover glass may have any other suitable shape—for example, if the instrument has only a short arcuate scale, the instrument case and cover glass might be sector-shaped.

In all the constructions illustrated the pointer of the instrument is indicated at 1 and the instrument scale is indicated by reference numeral 2. This scale 2 is flat, and in the constructions shown may be either completely circular, or semicircular, or arcuate. Also the pointer is shown as mounted on a shaft 3 which is rotated by the instrument mechanism (not shown) to move the pointer 1 over (or, in some cases, behind) the scale 2.

Figure 2:
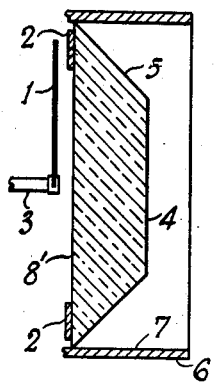
Fig. 2 is a sectional elevation of an alternative arrangement.
Figure 3:
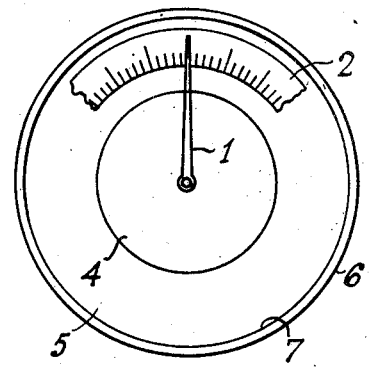
Fig. 3 is a front view of both Figs. 1 and 2.

In Figs. 1 to 3 the instrument cover glass has a central plane portion 4 and the peripheral portion 5 of the glass has its front or outer surface inclined to the plane of the central portion 4. This part 4 is parallel to the plane of the scale or to the plane in which the pointer moves and hence the peripheral portion 5 of the cover glass is inclined with respect to a line perpendicular to these planes, this line being the normal line of vision for viewing the instrument. The inclined or bevelled portion 5 of the cover glass is of sufficient width to enable the scale and pointer to be viewed therethrough and hence forms what may be termed an inclined "viewing window" as distinct from the slight bevel commonly made at the edge of glass discs or sheets to minimise the possibility of fracture. Round the edge of the cover glass is placed a cylindrical opaque shield 6 of metal or other suitable material and the inner surface 7 of this shield is blackened so that no light can be reflected from the inclined viewing window 5 into the eyes of the observer.

In the construction shown in Fig. 1, both the front surface of the cover glass and its back surface 8 have inclined portions so that the cover glass has the shape of a hollow conical frustum. In the construction shown in Fig. 2, the cover glass is in the form of a solid truncated cone with a plane back 8' and the scale 2 can be secured on this back surface 8' or can be etched or otherwise marked on the glass itself. It is found in practice that reflections from the plane back surface 8' are not troublesome and cannot be detected under ordinary conditions of use.

Figure 4:
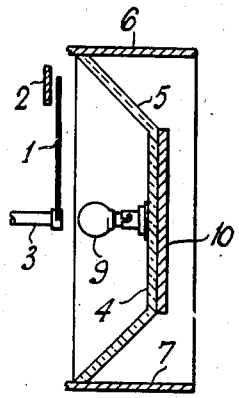
Figs. 4 and 5 are sectional elevations of modified arrangements with provisions for illuminating the instrument dial.
Figure 5:
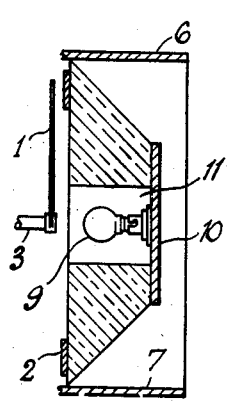
Figure 6:
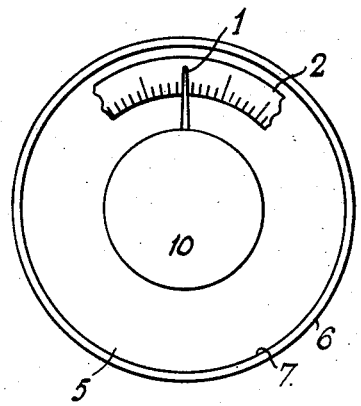
Fig. 6 is a front view of the constructions shown in Figs. 4 and 5.

The constructions above described can be combined with means for illuminating the scale and pointer by utilising the inclined part 5 of the cover glass as part of an optical system for the internal illumination of the instrument. Suitable arrangements for this are shown in Figs. 4 to 6, of which Fig. 4 shows a construction similar to that shown in Fig. 1 but with a light source 9, which conveniently consists of a small electric bulb in a suitable holder, placed behind the central plane portion 4 of the cover glass. A circular light shield 19 consisting of a disc of metal or other opaque material is secured over the part 4 of the glass to prevent direct light from the source 9 reaching the observer's eyes. Fig. 5 shows a modification of the arrangement of Fig. 2, with the light source 9 located in a recess 11 in the solid truncated glass cone which forms the instrument cover glass and with an opaque light shield 10 on the outside of the glass. In both these cases the light from the source 9 is reflected by the inclined surface 5 on to, or through, the scale 2.

Figure 7:
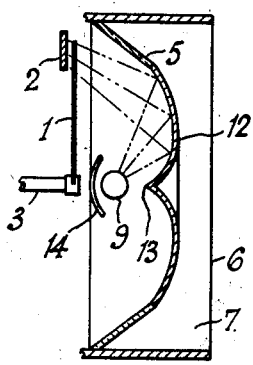
Fig. 7 is a sectional elevation of another arrangement.
Figure 8:
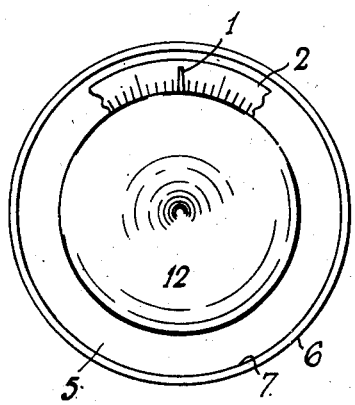
Fig. 8 is a front elevation thereof.
Figure 10:
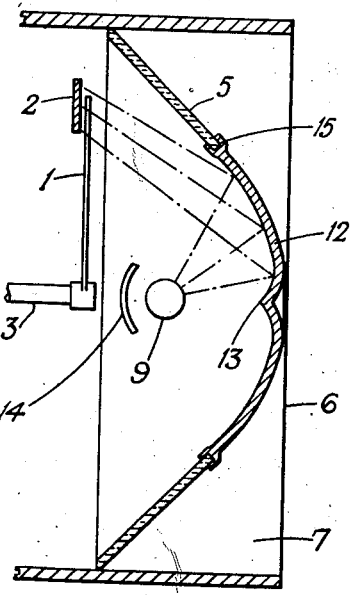
Fig. 10 is a sectional elevation of another form of the invention showing a conventional form of gripping means at the periphery of the reflector.

As some of the light from the source does not fall on the inclined part of the glass it is obviously an advantage to make the central part of the cover glass as a reflector which directs light from the source on to the pointer and scale. Figs. 7 and 8 show a construction in which this is done. As before, the viewing window 5 is inclined to the normal line of sight and is surrounded by the light shield 6 having a non-reflecting inner surface 7. The area bounded by the peripheral viewing window 5 is not made plane as in the other constructions but is shaped as a curved surface of revolution 12 which merges at its periphery into the viewing window 5 and at its centre is brought to a point 13 opposite the light source 9. The part 12 is so shaped that light rays from the light source 9 are reflected on to the scale 2 and the end of the pointer 1, as indicated by the chain dotted lines. This reflector 12 may be of glass made in one piece with the viewing window 5 and in this case the outer or inner surface of the reflector may be silvered or otherwise treated to improve the reflecting properties of the glass and ensure that no direct light from the source 9 reaches the observer's eyes, or the part 12 may be of polished metal or other suitable reflecting material formed at its periphery to grip the inclined glass ring forming the viewing window 5. In the modification shown in Fig. 10, the reflector is shown as made in two separate parts, the reflector portion 12 and the viewing window 5. The outer edge of the portion 12 is provided with a groove or channel 15 which snugly receives the inner marginal portion of the window 5. Behind the light source 9 is positioned a small spherical reflector 14 to direct the light from the source 9 towards the part of the reflector 12 surrounding its point 13.

Figure 9:
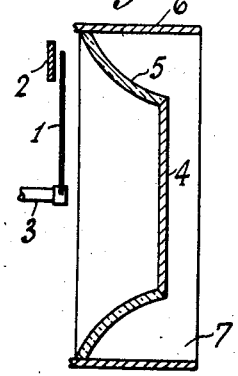
Fig. 9 is a sectional elevation showing another form of cover glass.

As shown in Fig. 9, the inclined portion or "viewing window" 5 of the cover glass may have a curved or hollowed surface to enable a minimum height of shield 6 to be used.

The particular cross-sectional shape of the viewing window is determined by the fact that light coming over the top edge of the shield must not be reflected into the observer's eyes and the observer must be allowed a certain freedom of choice in viewing position, which will depend on circumstances. For example, instead of making the inclined part of the glass flat it may be parabolic in cross section.

Although in the above detailed description and in the drawings a circular form of cover glass is described and shown it will be obvious that the cover glass may only be shaped as part of a circle, i. e. semicircular or sector shaped, while if necessary the instrument scale might be a horizontal or vertical rectangular scale with a rectangular case and cover glass.

Furthermore, instead of the stationary scale and movable pointer as indicated in the drawings, the pointer or indicating means may in some case be fixed and the dial of the instrument made movable with respect thereto, except, of course, in the case where the scale is attached to, or marked directly on the back of the cover glass.

Although it is common practice to put a slight bevel on the edge of the cover glass of an instrument it should be noted that the present invention is distinguished from this common arrangement by the fact that the usual bevel is not the part of the glass through which the scale is viewed, whereas in the present case the inclined or bevelled part of the glass is made sufficiently wide so that it comes over the scale and pointer and forms that portion of the glass through which the reading is viewed.

The arrangements above described are applicable to a wide variety of indicating instruments among which may be mentioned compasses, oil gauges, depth indicators of echo-sounding installations, electrical measuring instruments and navigational or aircraft instruments.

What I claim as my invention, and desire to secure by Letters Patent is:

1. In an indicating instrument, a circular cover glass having an annular peripheral portion, inclined to the normal line of vision for viewing the instrument and constituting a viewing window, and a central reflecting portion of concave conoidal shape with its point inwards, a light source positioned opposite the point of the aforesaid reflector, a concave reflector behind the light source, and an upstanding light shield at the periphery of said cover glass.

2. In an indicating instrument, a circular cover glass having an annular peripheral portion inclined to the normal line of vision for viewing the instrument and constituting a viewing window, the area of the cover glass bounded by the peripheral viewing window being shaped as a curved surface of revolution and merging at its periphery into viewing window, said curved surface being provided with a point at its center, a light source disposed opposite to and spaced from said point, and a concave reflector behind the light source and disposed in overlapping relation to said point, said curved surface of the cover glass being silvered to provide a reflecting surface.

DONALD ORR SPROULE.